(12) United States Patent
Rowe et al.

(10) Patent No.: US 8,550,385 B2
(45) Date of Patent: Oct. 8, 2013

(54) PROCESS OF TREATING INDUSTRY FILTRATION MEDIA

(75) Inventors: Glenn S. Rowe, Troy, MI (US); Charles H. Sorrick, Harbor Beach, MI (US)

(73) Assignee: Crystal Filtration Company, Rochester Hills, MI (US)

( * ) Notice: Subject to any disclaimer, the term of this patent is extended or adjusted under 35 U.S.C. 154(b) by 365 days.

(21) Appl. No.: 12/968,009

(22) Filed: Dec. 14, 2010

(65) Prior Publication Data

US 2011/0139911 A1 Jun. 16, 2011

Related U.S. Application Data

(60) Provisional application No. 61/286,189, filed on Dec. 14, 2009.

(51) Int. Cl.
*B02C 1/00* (2006.01)
*B02C 17/00* (2006.01)

(52) U.S. Cl.
USPC .......................................... 241/21; 241/24.11

(58) Field of Classification Search
USPC ................................................. 241/21, 24.11
See application file for complete search history.

(56) References Cited

U.S. PATENT DOCUMENTS

| 5,366,165 A | * | 11/1994 | Jackman | .......................... 241/20 |
| 2006/0272679 A1 | | 12/2006 | Roberts et al. | |

FOREIGN PATENT DOCUMENTS

JP          2001212413 A        8/2001

* cited by examiner

*Primary Examiner* — Faye Francis

(74) *Attorney, Agent, or Firm* — Rader, Fishman & Grauer PLLC

(57) ABSTRACT

A method of treating industry filtration media provides for cutting used filtration media into small pieces and densifying the cut-up used filtration media for further use in waste recycling. The filtration media can come in rolls or loose. Prior to cutting, a ferrous part of the filtration media can be separated from a non-ferrous part thereof, and the non-ferrous part can be subjected to brushing prior to cutting. The cut-up used filtration media can also be mixed with clean scraps prior to the step of densifying.

4 Claims, No Drawings

PROCESS OF TREATING INDUSTRY FILTRATION MEDIA

The present invention relates to ecology and deals with environmental issues. More specifically, the invention relates to processing industrial waste, and even more specifically—to the utilization of industry filtration media.

In the metal working field, coolants are applied to a substrate during a metal working process such as grinding or machining. As it leaves the substrate, the coolant contains metal fines from the metal working process. In order to reutilize the coolant, it becomes necessary to filter the coolant to separate the metal fines. In general, the filtration media coming from a plant such as an automotive plant can contain plastic, and/or mixed plastic, and/or cellulose, metal particles and powder, oil films and grease associated with the machines under the metal working conditions. Depending on virgin materials, plastics can be represented by thermoplastics such as polyolefins, polypropylene, polyethylene, TPO (Thermo-Plastic Olefin), nylon, polyester, PET (polyethylene-terephthalate), and the like, and mixtures thereof. With regard to metal particles, shavings and powder, it is to be appreciated that there are a wide variety of metal working operations which require the utilization of filtration media and, correspondingly, the generation of waste filtration media. Some type of metal filtering would produce waste resulting from the processes of rolling, washing, grinding, honing and the like. A variety of metals are subjected to metal working such as aluminum, chrome, iron based materials such as steel such as stainless steel, and the like. The metal products collected by filtration media can be from submicron in size (embedded powdered aluminum, for example) to several inches. The filtration media that may be utilized in the present invention is, for example, that described in U.S. Pat. Nos. 4,925,560 and 5,714,067 incorporated hereby by reference in their entirety.

As a result of production activities, the filtration media used in filtering gets clogged with the fines of metal and other materials used in the processes involved. During the course of the metal working process, the filtration media needs to be changed to ensure a sufficient efficiency and a high quality filtering process. The soiled filtration media is removed in volume from the filtering process.

Accordingly, a need exists in industries where the filtration media is used and where the soiled filtration media is removed from the filtering process for environmentally safe treating and utilizing the filtration media instead of sending it to a landfill.

The method according to the invention comprises providing used filtration media—in rolls or loose, cutting the used filtration media into small pieces; densifying the media after cutting. Additionally, the process according to the present invention may comprise first separating ferrous large particles from non-ferrous ones and then subjecting the non-ferrous media to brushing on a brush machine to remove majority of metal, after which cutting and densifying would follow. The cut-up filtration media can also be mixed with clean scraps.

A non-ferrous part of the filtration media, for example in the form of rolls of dirty filtration media that have been used in liquid filtration, contains plastic, and/or mixed plastic and/or cellulose, depending on the virgin material; aluminum particles and/or shavings that range in size from one micron to three inches; embedded powdered aluminum, submicron in size; trace amounts of oil film, which, having been densified into the final product, improve the quality product by increasing its BTU. A ferrous part of the filtration media can come in, for example, rolls of used dirty liquid filtration filter media, or loose dirty liquid filtration filter media or dirty filter bags for liquid filtration or dirty pleated filter bags from liquid filtration or dirty cartridges for liquid filtration.

Brushing is performed on a brush machine to remove all the aluminum components that are large enough to be brushed off. Brushing machines known in the art (such as those made by Automated Components International, Dunmore, Pa. (http://www.acpsr.com/brushing.htm)) can be used for this operation. The size of the particles brushed off depends on the size and density of bristles used.

After the rolls are brushed off, they are cut down to smaller pieces and put in containers by weight, for example in 90 lb batches.

The densifier increases the "loose" weight of waste. The material is also degassed and completely dried. The densifier operates in batches, and the processing chamber can be loaded before and during the process. The high-energy blades shred the material and press it under the rotor. The friction heats the material to the processing temperature. At this temperature, the material becomes highly viscous. Subsequently, water is injected into the process which causes the material to densify. For this operation, densifiers available on the market, such as D 1500 of OCI GmbH, Zug, Switzerland, can be used. Since, in accordance with the present invention, the densifier has to deal with not only plastic but metal particles as well, the blades can be hardened to prolong their lifetime.

The densified product comprising the non-ferrous portion of the dirty filtration media, would include single or mixed plastics with some cellulose and a small amount of oil, with between 10 to 50% of aluminum. Thus, the encapsulated powdered metal becomes a part of a final product increasing its BTU and presenting metallurgical advantages. It would offer BTU value of 7,500÷16,000 and can be used in cement kilns. Subject to the regime of densifying, the final product can be in a pop corn shape, chips, slivers, arranged in size from one half inch to three inches. Also, the processed non-ferrous part can be sent to a customized gasifier or calciner to be gasified. During gasification, the organic materials such as plastics, oil film, cellulose, or any small amounts of other organics, will be turned into a synthetic gas (syngas) and/or useable oil. The syngas and the oils can be used for some type of energy generation. The inorganic materials (non-ferrous) will end up becoming a non-oxidized non-ferrous ash or bi-product. This material can be sent to a metal recycling facility or directly sent to a facility that could use non-ferrous material. The gasification process eliminates or greatly reduces the exposure to oxygen; therefore, it will not oxidize the inorganic material. The non oxidized ash or bi-product or non-ferrous material can be used at a variety of metal recycling processes, which may include a process that is making metal for the automobile industry, therefore, becoming a part of a car.

The product densified from the ferrous portion of the dirty filtration media, would include single or mixed plastics with some cellulose and a small amount of oil, with ferrous metals and little or no aluminum. It can be used in cement kilns as well, but also instead of a low-grade coke and in furnaces. The processed ferrous part can also be sent to a customized gasifier or calciner to be gasified. During gasification, the organic materials such as plastics, oil film, cellulose, or any small amounts of other organics, will be turned into a synthetic gas (syngas) and/or useable oil. The syngas and the oils can be used for some type of energy generation. The inorganic materials (ferrous) will end up becoming a non-oxidized ferrous ash or bi-product. This material can be sent to a metal recycling facility or directly sent to a facility that could use ferrous material. The gasification process eliminates or greatly reduces the exposure to oxygen; therefore, it will not oxidize the inorganic material. The non oxidized ash or bi-product or ferrous material can be used at a variety of metal recycling processes, which may include a process that is making metal for the automobile industry, therefore, becoming a part of a car. The ferrous material can also replace ferrous fines that the industry adds to its products. When shipped to a steel mill, the ferrous part can be used in blast furnaces. The plastic part of the product adds BTU and replaces low-grade coke. The steel part of the product becomes a part of the mix and eventually ends up becoming a part of a steel coil used by the automotive industry.

What is claimed is:

1. A method of treating industry filtration media, the method comprising the steps of:
    providing used filtration media,
    separating a ferrous part of the filtration media from a non-ferrous part thereof,
    subjecting the non-ferrous part to brushing,
    cutting the used filtration media into small pieces,
    mixing the cut-up used filtration media with clean scraps, and
    densifying the cut-up used filtration media, to thereby use the media for waste recycling,
    the filtration media being provided in rolls or loose.

2. A method of treating industry filtration media, the method comprising the steps of:
    providing used filtration media,
    separating a ferrous part of the filtration media from a non-ferrous part thereof, the separation step being performed prior to the step of cutting,
    cutting the used filtration media into small pieces,
    densifying the cut-up used filtration media, to thereby use the media for waste recycling.

3. The method as claimed in claim 2, further comprising subjecting the non-ferrous part to brushing, the step of brushing being performed prior to the step of cutting.

4. The method as claimed in claim 2, further comprising mixing the cut-up used filtration media with clean scraps prior to the step of densifying.

* * * * *